(12) United States Patent
Soares et al.

(10) Patent No.: US 8,735,307 B2
(45) Date of Patent: May 27, 2014

(54) FILLER PASTE, COATING PAINTING AND COMPOSITE FOR COATING WOODEN POLES

(75) Inventors: Bluma Guenther Soares, Rio de Janeiro (BR); Fabio Ladeira Barcia, Rio de Janeiro (BR)

(73) Assignee: Light Servicos de Electricidade S.A., Rio de Janeiro (BR)

( * ) Notice: Subject to any disclaimer, the term of this patent is extended or adjusted under 35 U.S.C. 154(b) by 45 days.

(21) Appl. No.: 13/267,623

(22) Filed: Oct. 6, 2011

(65) Prior Publication Data

US 2012/0122362 A1    May 17, 2012

(51) Int. Cl.
  *B32B 27/12*    (2006.01)
(52) U.S. Cl.
  USPC .............................. 442/123; 442/124; 442/125

(58) Field of Classification Search
  None
  See application file for complete search history.

(56) References Cited

U.S. PATENT DOCUMENTS

2007/0293614 A1* 12/2007 Zhou et al. ..................... 524/405
2009/0220795 A1* 9/2009 Connelly et al. .............. 428/414

* cited by examiner

*Primary Examiner* — D. Lawrence Tarazano
*Assistant Examiner* — Klee S. O. Simmons
(74) *Attorney, Agent, or Firm* — Arent Fox LLP

(57) ABSTRACT

It is an object of the invention to provide a number of coatings for protection of wooden poles including filler paste, coating paints and glass fiber-polyester resin based composites which may be applied to wooden poles in the field. These coatings contain different anti-flame and antifungal additives.

4 Claims, No Drawings

FILLER PASTE, COATING PAINTING AND COMPOSITE FOR COATING WOODEN POLES

This application claims priority to Brazilian Application No. 020100093761 filed on Oct. 6, 2010, entitled "FILLER PASTE, COATING PAINTING AND COMPOSITE FOR COATING WOODEN POLES. The disclosure of the prior application is hereby incorporated by reference in its entirety.

FIELD OF INVENTION

The present invention refers in general to coatings for wooden poles used in electric power distributing lines and particularly to polymeric coatings resistant to flame and xylophagous agents.

BACKGROUND

Medium-to-high voltage electric power distributing lines still use wooden poles nowadays, mainly in rural zone, city periphery and mainly in elevated regions. The advantage of the wooden poles with respect to concrete poles, in the latter case, is due to its lower weight that makes it easier the installation thereof in areas of difficult access. However, these poles are to be replaced periodically due to early deterioration primarily caused by the action of xylophagous agents, fungi and also burning that always occurs in rural areas.

An alternate sufficiently advantageous for the problems mentioned above is to cover the poles prior to installing or already installed with materials capable of performing double function: to protect the wood against xylophagous agents and against burning. One of the most versatile materials to be used as coating is epoxy resin. Epoxy resin is a low viscosity liquid material that upon reacting with another component, also referred to as hardener, becomes rigid. The epoxy resin also provides high adhesion capacity to metal and wooden substrates etc. and has high barrier property, that is, it is impervious to water and other chemical agents.

Thus, epoxy resin is a string candidate to protect wooden poles. However, the flame resistance thereof is low.

In the prior art methods for extending the service life of wooden poles are already known.

The patent document U.S. Pat. No. 5,553,438, published Sep. 10, 1996, "Methods of extending wood pole service life", refers to extending the service life of wooden poles by forming the butt end portion thereof with slots that penetrate deeply into the wood prior to treatment of the wood with preservatives. After drying, the butt end of the pole is encased in a shell, suitably of polymers, that is bonded to the butt of the pole and presents a barrier to the penetration of fungus or insects, and likewise prevents the passage of liquids which might leach preservative from the pole into the surrounding ground.

The patent document U.S. Pat. No. 5,185,214, published Feb. 9, 1993, "One step process for imparting decay resistance and fire retardancy to wood products", refers to a one step process for imparting both decay resistance and fire retardancy to wood and cellulosic materials by impregnating the products with a treatment solution composed of a water soluble mixture of a tertiary and quaternary ammonium preservative compound and an organic phosphate fire retardant compound. This document does not disclose nor suggest any material having the anti-flame characteristic as the intended invention.

The company American Pole & Timber, www.americanpoleandtimer.com, provides wooden treated with the patented resin 21 POLY to extend the service life of the poles reducing exposure of the wooden core. However, said resin 21 POLY is a polyurea system of plural components. Further, the application of the same occurs by means of a spraying system at high pressure and high temperature. The drawback of this resin 21 POLY is that it is a system of complex application. This resin 21 POLY does not provide anti-flame characteristic or the capacity of application on site.

OBJECT OF THE INVENTION

It is an object of present invention to provide a number of coatings for protection of wooden poles including filler paste, coating paint and composites based on fiber glass fabric and polyester resin which may be applied to wooden poles on site. These coatings contain different anti-flame and anti-fungus additives.

SUMMARY OF THE INVENTION

A polymeric material having resistance to flame and xylophagous agents to be used as a coating in wooden poles located in rural and peripheral areas in big cities.

The polymeric material is comprised of a polymeric matrix based on epoxy resin containing inorganic additives having anti-flame capacity.

DESCRIPTION OF THE INVENTION

The medium-and-low voltage electric power distributing lines nowadays still use wooden poles in rural areas, periphery of cities and primarily in elevated regions. The advantage of the wooden poles with respect to concrete poles is due to its lower weight that makes it easier the installation thereof in areas of difficult access. However, these poles are to be replaced periodically due to early deterioration primarily caused by the action of xylophagous agents, fungi and also burning that often occurs in rural areas.

An alternate sufficiently advantageous for the problems mentioned above is to cover the poles prior to installing or already installed with materials capable of performing double function: to protect the wood against xylophagous agents and against burning. One of the most versatile materials to be used as coating is epoxy resin.

Epoxy resin is a low viscosity liquid material that upon reacting with another component, also referred to as hardener, becomes rigid. The epoxy resin also provides high adhesion capacity to metal and wooden substrates etc. and has good barrier property, that is, it is impervious to water and other chemical agents. In view of that epoxy resin is optimum to protect wooden poles. However, the frame resistance of epoxy resin is low what makes it necessary to include in the same certain anti-flame additives.

The object of present invention is to provide a series of epoxy resin based coatings for protecting wooden poles, including filler pastes, coating paints and composites based on fiber glass fabric and polyester resin. The coatings containing different anti-flame and anti-fungus additives have been assessed as to adhesion to wood, flame test and thermal resistance. Filler pastes shall have as the requirement resistance to termite attack; while the coating paint shall provide as the main requirement flame resistance.

As filler pastes and coating paints there were used DGEBA epoxy resin (DER 331 of Dow Chemical) and bromine epoxy resin (Dow Chemical), respectively. As curing agent (hardener) there was used an aromatic polyamine. The ratio epoxy resin/hardener used was 100:60 parts, corresponding to a stoichiometric ratio. Mineral loads were used based on alumina, talc (magnesium hydroxide) and silica. As specific anti-flame agents there were used phosphite-based swallowers (Exolit AP422e Charmax from different vendors) and antimony-based anti-flame.

As composites there was used fiber glass fabric impregnated with poly(ethylene terephthalate) resin (PET resin) or bromine epoxy resin. The impregnation was made manually, with the help of an appropriate roll. Both the PET resin and the bromine epoxy resin also contained a quantity of alumina and anti-flame agents.

Mixtures for the filler pastes and coating paints were prepared in intensive mixer at ambient temperature. In all mixtures the cure was conducted at room temperature, since for application in the field it is much easier to use formulations that do not require heating for the curing reaction be promoted.

The adhesion test to wood for the filler pastes and coating paints was performed using Patti methodology based on covering a big part of the wood with the coating under analysis. After the hardening of this coating, several aluminum devices, referred to as dolly are glued to the surface thereof. Then the test consists of measuring the force to pull these dollies from the surface of wood.

In order to evaluate the flammability properties of filler pastes and coating paints there were used international standards based on comparative study of behavior. Horizontal Burning test was used (ASTM D635). This test consists of attaching a test specimen in one end, the test specimen being 125 mm long and 0.5 mm wide, keeping its inclined plane to 45° from the horizontal plane. Then, it is placed a Bunsen nozzle adjusted to blue flame 25 mm long in contact with the free end for 30 sec. Then the path traveled by the flame is followed along the test specimen checking if the flame reaches the mark of 25 mm. The time the flame took to reach the first mark (25 mm) is recorded, as well as the second mark (75 mm). In the case the flame is extinguished before reaching the first mark, the time is recorded.

Formulations for Filler Pastes

The pastes that will be used to fill the gaps in the poles were prepared using formulations consisting of Component A (the main component of which is epoxy resin) and component B (the main component of which is the hardener—aromatic amine based).

For the component A epoxy resin of the type DGEBA (diglycidyl ether of bisphenol A) (DER331 of Dow Chemical) and bromine epoxy resin of the type DGEBA functionalized with bromine and marketed in acetone (DER 592-A80) also of Dow Chemical were used.

For component B an aromatic polyamine (p,p'-methylene dianiline) was used.

20 different formulations were prepared in which it was studied the effect of epoxy resin type, the type of load, the type of hardener and the presence or not of the liquid cashew shell (LCCC) and of Fipronil (poison typically used for termite extermination available from Rogama).

Table 1 shows the main formulations developed in present invention.

TABLE 1

Formulations for filler paste (MP)

| | MP1 | MP2 | MP3 | MP4 | MP5 | MP6 | MP7 |
|---|---|---|---|---|---|---|---|
| Component A | Quantity in grams/Percent (%) | | | | | | |
| Bromine epoxy resin | 0/0 | 100/65.7 | 35/51.6 | 35/43.7 | 35/36.8 | 35/35 | 35/36.5 |
| Epoxy resin type DGEBA | 100/49.3 | 0/0 | 0/0 | 5/6.3 | 10/10.6 | 10/10 | 10/10.4 |
| Aerosil R202 (silica nanoparticles) | 2.2/1.1 | 2.2/1.5 | 0/0 | 0 | 0 | 0 | 0 |
| Alumina | 50/24.8 | 25/16.4 | 25/36.7 | 20/25 | 35/36.8 | 35/35 | 35/36.5 |
| Talc (MgO) | 50/24.8 | 25/16.4 | 8/11.7 | 20/25 | 15/15.8 | 15/15 | 15/15.5 |
| LCCC | 0/0 | 0/0 | 0/0 | 0 | 0 | 5 g/5 | 0 |
| Poison for termite (Fipronil) | 0/0 | 0/0 | 0/0 | 0 | 0 | 0 | 1/1.1 |
| Component B | Quantity in grams | | | | | | |
| Aromatic amine | 60/41.1 | 60/50.6 | 10/49.5 | 38/41 | 47/44 | 47/44 | 47/44 |
| Aerosil R202 | 1.2/0.8 | 2.2/1.8 | 0.2/1.0 | 0.6/0.6 | 0.6/0.6 | 0.6/0.6 | 0.6/0.6 |
| Alumina | 30/20.5 | 28/23.8 | 10/49.5 | 29/31.4 | 29/27.2 | 29/27.2 | 29/27.2 |
| Talc | 55/7.6 | 28/23.8 | 0 | 25/27 | 30/28.2 | 30/28.2 | 30/28.2 |

Bromine epoxy resin: type DGEBA (diglycidyl ether of bisphenol A) functionalized with bromine and marketed in acetone (DER 592-A80)—used to act as a flame retardant helper since the presence of bromine in molecules promotes rapid extinction of the flame.

Epoxy resin type DGEBA (diglycidyl ether of bisphenol A): DER331 (Dow Chemical or EPON 828 Shell Quimica).

R202: silica of Aerosil type R202—silica is used to prevent the paint from dripping during application and before the complete drying. When using other loads, the presence of silica can be avoided.

LCCC: liquid of cashew nut shell (rich in cardanol, a phenol highly bactericidal) and that can act in eliminating termites and other xylophagous agents.

Termite poison: Fipronil.

Aromatic amine: adduct of aromatic polyamine TH-438 of company America Sales used as hardener, i.e. as the main part of Component B in formulations.

Alumina—load used to provide flame resistance to the material.

Talc—magnesium based load, used to improve the mechanical strength of the filler pastes and coating paints.

Evaluation of Flame Resistance

The wooden poles suffer cracks under the action of sun, rain and heat. These cracks facilitate entry of termites and other xylophagous agents contributing to early wear of the wooden poles. Filler pastes are intended to fill these cracks before applying the coating paint or composite. Several formulations were tested in this invention. The Table 1 above shows the ones providing better results in terms of flame resistance.

For each formulation above there were made test specimens for flame resistance test.

In the case of MP3 formulation 60 sec of flame were applied in all test specimens and no one burned. Such formulations have excellent flame resistance due to the presence of bromine resin in combination with alumina as load. However, the material was very flexible. The formulation MP4 also presented very good flame resistance, but some specimens showed the flame application area partially carbonized. The MP5 formulation was the formulation that showed better results. Four sequences of fire of 60 sec. each were applied and after all applications of fire the material of formulation MP5 did not burn.

Adhesion Evaluation

The adhesion test in wood of the filler pastes and of the coating paint was conducted using Patti methodology. Said methodology is based on covering a big part of the wood with the coating under analysis. After the hardening of this coating, several aluminum devices, referred to as dollies, are glued to the surface thereof.

The test consists of measuring the force to pull these dollies from the surface of wood.

The tests were performed in the following test specimens:

1) wooden board covered with the MP6 formulation (containing LCCC in its formulation);
2) wooden board painted with LCCC and covered with the MP6 formulation (containing LCCC in its formulation);
3) wooden board covered with the MP7 formulation (containing 2% crisoto in its formulation);
4) wooden board treated with Thermidor and covered with the MP7 formulation (containing Thermidor in its formulation);
5) wooden board covered with MP5 formulation without LCCC or poison;
6) wooden board covered with REV16 formulation without additives;
7) wooden board covered with REV 16 formulation with LCCC;
8) wooden board covered with REV 16 formulation with termite poison;
9) wooden board covered with REV 17 formulation without additives;
10) wooden board covered with REV 16 formulation with LCCC;
11) wooden board covered with REV 16 formulation with poison.

For each formulation for coating paints, 10 dollies were glued to the surface and the force to pull them was measured. In total 110 tests were performed. It is noted that with REV16 the damage after adhesion test was much smaller than with other coating, indicating better adhesion power of that material.

Table 2 shows the results obtained in terms of force required to pull the devices

| Formulations | Force (MPa) | Formulations | Force (MPa) |
|---|---|---|---|
| MP5 | 43 | REV16 | 46 |
| MP6 | 29 | REV16 with LCCC | 32 |
| MP5 In wood treated with LCCC | 9 | REV16 with poison | 31 |
| MP7 | 27 | REV17 | 43 |
| MP5 in wood treated with poison | 29 | REV17 with LCCC | 28 |
| | | REV17 with poison | 35 |

According to the adhesion tests, all formulations of coating paints provided similar adhesion results. However the results of coatings containing LCCC or poison were below those obtained with the pure coating.

The only coating that showed worse adhesion was when the wood was previously treated with LCCC.

Formulations for Coating Paints

For the coating paints it was used bromine epoxy resin and several additives including swallowers and anti-flame additives. The major formulations are presented in Table 3. For the coating paint the formulation has to be more fluid so that it can be applied with a brush or varnish brush, however without dripping.

As this paint will be on the outside covering the wooden pole, some anti-flame additives, referred to as swallowers, were tested in addition to the conventional loads for anti-flame protection as alumina.

The resins used were bromine epoxy resins and conventional non-bromine resins.

Alumina was used as load.

Three types of swallowing agents commercially found were used: Exolit ap422, Charmax and the mixture of DB-17 and SB-S.

LCCC was used in one of the formulations for confirming termite resistance.

For this study different formulations were developed that are shown in Table 3.

All formulations shown in Table 3 presented excellent flame resistance. The formulations of coatings of Table 3 were applied to eucalyptus bollards and then fire from a blowtorch was used. After two minutes of intense flame the material was carbonized, but not burned.

TABLE 3

Formulations for coating paints.

| | REV013 | REV016 | REV017 | REV018 | REV019 |
|---|---|---|---|---|---|
| Component A (grams/percent (%)) | | | | | |
| Epoxy resin | 0 | 10/33.3 | 10/31.7 | 0 | 0 |
| Bromine epoxy resin | 50/45.1 | 15/50 | 15/47.8 | 100/66.3 | 100/70.2 |
| Aerosil R202 (silica nanoparticles) | 1/0.9 | 0 | 0 | 1/0.6 | 1/0.7 |
| LCCC | 0 | 0 | 1.5/4.7 | 0 | 1.5/1.1 |
| Alumina | 20/18 | 0 | 0 | 30/19.8 | 30/21 |
| Exolit ap422 (swallower) | 40/36 | 0 | 0 | 15/9.9 | 0 |
| Charmax ZB200 (swallower) | 0 | 5/16.7 | 5/15.8 | 5/3.4 | 0 |
| DB-17 (flame retardant) | | | | | 7.5/5.3 |
| Sb-S (flame retardant) | | | | | 2.5/1.7 |
| Component B (gram/percent (%)) | | | | | |
| Aromatic amine | 29/65.2 | 14.5/73.4 | 14.5/80.5 | 60/65.9 | 60/65.9 |
| Aerosil R202 (silica nanoparticles) | 0.5/1.2 | 0.25/1.3 | 0.25/1.5 | 1/1.1 | 1/1.1 |
| Exolit ap422 (swallower) | 10/22.4 | 0 | 0 | 20/22 | 20/22 |
| Charmax ZB200 (swallower) | 0 | 5/25.3 | 3.25/18 | 0 | 0 |
| Alumina | 5/11.2 | 0 | 0 | 10/11 | 10/11 |

All formulations provided excellent results. However the best flame resistance was achieved with the REV018 and REV019 formulations. The great advantage of REV019 is the use of two swallowers nationally manufactured which saves costs of material.

Bromine epoxy resin: type DGEBA (diglycidyl ether of bisphenol A) functionalized with bromine and marketed in acetone (DER 592-A80)—used to act as a flame retardant helper since the presence of bromine in molecules promotes rapid extinction of the flame.

Epoxy resin type DGEBA (diglycidyl ether of bisphenol A): DER331 (Dow Chemical or EPON 828 Shell Quimica).

R202: silica of Aerosil type R202—silica is used to prevent the paint from dripping during application and before the complete drying. When using other loads, the presence of silica can be avoided.

LCCC: liquid of cashew nut shell (rich in cardanol, a phenol highly bactericidal) and that can act in eliminating termites and other xylophagous agents.

Aromatic amine: adduct of aromatic polyamine TH-438 of company America Sales used as hardener, i.e. as the main part of Component B in formulations.

Alumina—load used to provide flame resistance to the material.

DB-17: BroFlam DB-17 is a flame retarding additive containing 83% aromatic bromine;

Sb-S—is a high quality antimony trioxide used as synergistic flame retarding additive in plastics; a combination of these two additives was made.

Charmax ZB200—is a zinc borate, magnesium and calcium based anti-flame agent.

All additives used were efficient to quickly extinguish the flame in the bollards. However, both the EXOLIT 422 as the CHARMAX are imported swallowers and difficult to purchase in the market. Therefore, the combination of the antimony based anti-flame additives (DB-17 and SB-S) are the most recommended from the point of view of economic viability.

Fiber Glass Based Composites

Bollards similar to those used previously were coated with fiberglass fabric of a gramature corresponding to 450 g/m², impregnated with the help of a manual roll, both with bromine epoxy resin and polyester resin. The formulations used in the respective resins are listed in Table 4.

TABLE 4

Formulations used for bromine epoxy resins and polyester resin.

| Formulation containing bromine resin | | Formulation containing polyester resin | |
|---|---|---|---|
| Component A | (g/%) | Component A | (g/%) |
| Bromine epoxy resin | 50/61 | Resin PET | 190/63.6 |
| Aerosil R202 (silica nanoparticles) | 1/1.2 | DMA dimethyl aniline | 0.48/0.2 |
| Alumina | 20/24.4 | Alumina | 60.6/20.2 |
| BYK320 (anti-bubble additive) | 1/1.2 | DB17 (retarding additive) | 28.5/9.5 |
| DB17 (retarding additive) | 7.5/9.2 | SB-S (synergistic retarding additive) | 9.5/3.2 |
| SB-S (synergistic retarding additive) | 2.5/3 | | 2.85/1.0 |
| | | BYK 9010 | 6.8/2.3 |

TABLE 4-continued

Formulations used for bromine epoxy resins and polyester resin.

| Formulation containing bromine resin | | Formulation containing polyester resin | |
|---|---|---|---|
| Fiber glass fabric | 60-70 g | Fiber glas fabric | 90-100 g |
| Component B | (g/%) | Component B | g/% |
| Aromatic Amine | 29/74.4 | Benzoyl peroxide | 3.8/100 |
| Aerosil R202 (silica nanoparticles) | 0.5/1.3 | | |
| Alumina | 5/12.8 | | |
| DB17 (retarding additive) | 3/7.7 | | |
| SB-S (synergistic retarding additive) | 1.5/3.8 | | |

Bromine epoxy resin: type DGEBA (diglycidyl ether of bisphenol A) functionalized with bromine and marketed in acetone (DER 592-A80)—used to act as a flame retardant helper since the presence of bromine in molecules promotes rapid extinction of the flame.

Polyester resin (PET resin)—PET resin made from post-consumer PET bottles.

R202: silica of Aerosil type R202—silica is used to prevent the paint from dripping during application and before the complete drying. When using other loads, the presence of silica can be avoided.

Aromatic amine: adduct of aromatic polyamine TH-438 of company America Sales used as hardener, i.e. as the main part of Component B in formulations including bromine epoxy resin.

Alumina—load used to provide flame resistance to the material.

DB-17: BroFlam DB-17 is a flame retarding additive containing 83% aromatic bromine.

Sb-S—is a high quality antimony trioxide used as synergistic flame retarding additive in plastics; a combination of these two additives was made.

BYK320 (polysiloxane-based anti-bubble additive modified with polyether.

DMA (dimethyl-aniline is an additive with basic features.

$TiO_2$ (titanium oxide)—used to clear the final material.

BYK-W9010—is an additive used to facilitate the dispersion of mineral loads in unsaturated polyester type resins.

Benzoyl peroxide—used as the initiator of free radicals and that will provide the cure of unsaturated polyester resin.

Fiberglass fabric having gramature 450 g/m² was used to provide dimensional stability to the coating and increase the flame resistance.

Composites prepared with polyester resin showed greater efficiency, since the bromine epoxy resin releases a little bit of black smoke when burned.

In both cases, the material did not burn after being subjected to treatment with blowtorch during 2 minutes.

In a test with a bollard coated with bromine epoxy resin and fiberglass fabric it was used only one layer of fiber glass fabric. The material did not burn and the integrity of the wood was fully maintained after the 2-minute flame test. After said test the fiber glass fabric and bromine epoxy resin based coating was sawed off and it was found that the fire failed to reach the wood after 3-minute test.

It was also developed coatings based on composites containing fiber glass fabric and polyester resin containing the same anti-flame agents mentioned previously.

Coatings were used containing one layer of fiber glass fabric and 5 layers of fabric. In this case it was also noted excellent flame resistance. The fire failed to reach the wood after 2-minute test. The same test was conducted in bollards containing 5 layers of fiberglass fabric and polyester resin having anti-flame agents.

It was noted that the use of antimony-based double anti-flame agent further to showing greater ease of acquisition, exhibits excellent flame resistance. Considering all the results obtained with the formulations of present invention one can conclude that the bromine resin has excellent flame resistance and can be used in the manufacture of coatings for wooden poles. This resin also exhibits excellent adhesion to wood.

However, the coating based on composite with fiber glass is much more efficient with only one layer of fiber glass fabric.

In present invention there were developed epoxy resin based coatings (filler paste and coating paints) or composites involving fiberglass. After several formulations and tests with a series of anti-flame additives we reached to three major formulations.

1. Filler Paste Based on Bromine Epoxy Resin.

This paste will receive about 1% anti-termite poison or about 5% liquid of cashew nuts shell for fighting termite. The LCCC is anti-bactericidal and can replace the poison that is typically used for this purpose, due to the high toxicity of poison in comparison with the LCCC. In addition, the LCCC is a by-product of the extraction and processing industry of cashew and it is an agricultural residue having high potential for use. It is important to inform that the liquid of the shell of the cashew nut (LCCC) is a natural product, abundant in the country and has 85% cardanol, a long chain phenol that exerts high bactericidal power. In addition, the acid characteristics thereof confer a greater reactivity. Thus, the material shall harden faster after application, accelerating the process of covering the poles.

Another important point is the joint use of bromine resin which also will make it difficult for fungi growing and the proliferation of termites in addition to being much more resistant to flame.

2. Coating Paint

This coating paint will be applied after the filler paste to a height of 2 m in the wooden pole. It is also based on bromine epoxy resin containing anti-flame agents based on phosphorus and antimony 3. Composites Based on Fiberglass They comprise a blanket containing resin based on polyester and fiber glass fabric and will be applied after filling the cracks of the pole with the filler paste. Said blanket will be applied in the field coating the pole with the coating paint and enclosing the pole with the blanket of appropriate gramature. The formulation of coating paint including epoxy resin also contains anti-flame agents based on phosphorus and antimony.

The invention claimed is:

1. Filler paste for wooden poles, comprising:
component A and hardener component B; wherein:
    component A comprises bromine epoxy resin in the range from about 36.5% to 36.8% by weight of the total weight of component A; diglycidyl ether bisphenol A epoxy resin in the range from about 10% to 10.4% by weight of the total weight of component A; alumina in the range of 36.8% to 36.5% by weight of the total weight of component A; talc in the range of 15.8% to 15.5% by weight of the total weight of component A; termite poison in the range of greater than 0% to 1.1% by weight of the total weight of component A; and
    said component B comprises aromatic amine in an amount of 44% by weight of the total weight of component B; silica nanoparticles in an amount of 0.6% by weight of the total weight of component B; alumina in an amount of 27.2% by weight of the total weight of component B; talc in an amount of 28.2% by weight of the total weight of component B.

2. A filler paste kit for wooden poles, comprising:
component A separated from hardener component B; wherein:
component A comprises bromine epoxy resin in the range from about 36.5% to 36.8% by weight of the total weight of component A; diglycidyl ether bisphenol A epoxy resin in the range from about 10% to 10.4% by weight of the total weight of component A; alumina in the range of 36.8% to 36.5% by weight of the total weight of component A; talc in the range of 15.8% to 15.5% by weight of the total weight of component A; termite poison in the range of greater than 0% to 1.1% by weight of the total weight of component A; and
said component B comprises aromatic amine in an amount of 44% by weight of the total weight of component B; silica nanoparticles in an amount of 0.6% by weight of the total weight of component B; alumina in an amount of 27.2% by weight of the total weight of component B; talc in an amount of 28.2% by weight of the total weight of component B.

3. The filler paste of claim 1, wherein the ratio of component A to component B is about 100:60.

4. The filler paste kit of claim 2, wherein the ratio of component A to component B is about 100:60.

* * * * *

UNITED STATES PATENT AND TRADEMARK OFFICE
CERTIFICATE OF CORRECTION

PATENT NO.       : 8,735,307 B2  
APPLICATION NO.  : 13/267623  
DATED            : May 27, 2014  
INVENTOR(S)      : Bluma Guenther Soares et al.

Page 1 of 1

It is certified that error appears in the above-identified patent and that said Letters Patent is hereby corrected as shown below:

Title Page

Please insert:

--<u>(30)</u>     <u>Foreign Application Priority Data</u>

<u>October 6, 2010   (BR) ..................... 02010093761</u>--

Signed and Sealed this  
Twelfth Day of August, 2014

Michelle K. Lee  
*Deputy Director of the United States Patent and Trademark Office*